UNITED STATES PATENT OFFICE.

MAX DOHRN, OF BERLIN, GERMANY, ASSIGNOR TO CHEMISCHE FABRIK AUF ACTIEN (VORM. E. SCHERING), OF BERLIN, GERMANY.

ETHYL ESTER OF 8-METHOXY-2-PHENYLQUINOLIN-4-CARBOXYLIC ACID.

1,045,378.   Specification of Letters Patent.   Patented Nov. 26, 1912.

No Drawing.   Application filed June 15, 1912. Serial No. 703,812.

*To all whom it may concern:*

Be it known that I, MAX DOHRN, doctor of philosophy, chemist, citizen of the German Empire, residing at Berlin, Germany, have invented a new and useful Improvement in Ethyl Esters of 8-Methoxy-2-Phenylquinolin-4-Carboxylic Acid, of which the following is a specification.

This invention relates to the manufacture of the ethyl ester of 8-methoxy-2-phenylquinolin-4-carboxylic acid, which is useful in the treatment of gout and articular rheumatism. The ester has the following constitution:

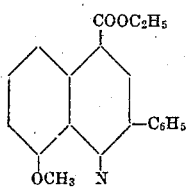

It forms pale yellow colored crystals and melts at about 109° C. and is soluble in alcohol, ether and benzene and forms salts with acids.

The new product may be obtained by esterification of the 8-methoxy-2-phenylquinolin-4-carboxylic acid, for instance in the following way: Dry hydrochloric acid gas is passed for some hours through an ethylalcoholic solution of 8-methoxy-2-phenylquinolin-4-carboxylic acid saturated in the cold with hydrochloric acid. The solution is precipitated with water, extracted with ether and the residuum of the ethereal solution recrystallized from alcohol.

I claim as my invention:

The herein described ethyl ester of 8-methoxy-2-phenylquinolin-4-carboxylic acid, melting at about 109° C., forming pale yellow colored crystals, being soluble in alcohol, ether and benzene, and forming salts, substantially as described.

In testimony whereof I have hereunto set my hand in the presence of two subscribing witnesses.

MAX DOHRN.

Witnesses:
HENRY HASPER,
WOLDEMAR HAUPT.